United States Patent [19]

Lee

[11] 4,134,872

[45] Jan. 16, 1979

[54] HETEROGENEOUS POLYMER PARTICLES COMPRISING AN INTERPOLYMER DOMAIN OF A MONOVINYLIDENE AROMATIC MONOMER, AN OPEN CHAIN ALIPHATIC CONJUGATED DIENE AND A MONOETHYLENICALLY UNSATURATED ACID

[75] Inventor: Do I. Lee, Midland, Mich.

[73] Assignee: The Dow Chemical Company, Midland, Mich.

[21] Appl. No.: 799,073

[22] Filed: May 20, 1977

[51] Int. Cl.$^2$ ............................................. C08L 33/00
[52] U.S. Cl. ........................ 260/29.7 UP; 260/29.7 W; 260/880 R; 427/391; 428/421
[58] Field of Search ................ 260/29.7 UP, 29.7 W, 260/880 R; 427/391; 428/421

[56] References Cited

U.S. PATENT DOCUMENTS

| | | | |
|---|---|---|---|
| 2,538,779 | 1/1951 | Harrison et al. | 260/29.7 |
| 2,614,089 | 10/1952 | Harrison et al. | 260/29.7 |
| 2,643,987 | 6/1953 | Harrison et al. | 260/880 R |
| 2,711,400 | 6/1955 | Harrison et al. | 260/880 R |
| 2,927,095 | 3/1960 | Witt | 260/29.7 UP |
| 2,944,044 | 7/1960 | Baer | 260/29.7 W |
| 3,095,320 | 6/1963 | Leitner | 260/29.7 W |
| 3,234,302 | 2/1966 | Wacome | 260/880 R |
| 3,409,569 | 11/1968 | Lane et al. | 260/29.7 W |
| 3,847,856 | 11/1974 | Mueller | 260/29.6 RB |
| 3,849,183 | 11/1974 | Chick et al. | 260/29.7 W |

FOREIGN PATENT DOCUMENTS 501656  4/1954  Canada .......................... 260/29.7 UP
649166  1/1951  United Kingdom.

OTHER PUBLICATIONS

Journal of Polymer Science Part C, No. 3, pp. 41–64, Bradford et al., (1963).
J. Macromol-Sci-Chem. A7(3), pp. 623–646, (1973), Keusch et al.
J. Elastoplastics, vol. 5, (Jan., 1973), pp. 6–19, Williams.

*Primary Examiner*—Melvyn I. Marquis
*Attorney, Agent, or Firm*—James B. Guffey

[57] ABSTRACT

Aqueous latexes of heterogeneous polymer particles comprising (1) a soft interpolymer domain of a monovinylidene aromatic monomer, such as styrene, an open chain aliphatic conjugated diene, such as 1,3-butadiene, and monoethylenically unsaturated carboxylic acid, such as acrylic acid, and (2) a hard resinous polymer domain (e.g., polystyrene) are useful binders for pigmented paper coatings having an improved combination of properties.

14 Claims, No Drawings

HETEROGENEOUS POLYMER PARTICLES COMPRISING AN INTERPOLYMER DOMAIN OF A MONOVINYLIDENE AROMATIC MONOMER, AN OPEN CHAIN ALIPHATIC CONJUGATED DIENE AND A MONOETHYLENICALLY UNSATURATED ACID

BACKGROUND OF THE INVENTION

This invention relates to stable aqueous latexes of interpolymers of a monovinylidene aromatic monomer, an open chain aliphatic conjugated diene and a monoethylenically unsaturated carboxylic acid and to the use of such latexes in paper coating.

Aqueous dispersions of polymers, which are referred to in the art as latexes, are generally known to be useful, both alone and in various formulations, as coatings and impregnants. A wide variety of latexes of differing homopolymeric and copolymeric composition (such as styrene-butadiene copolymers, acrylic homopolymers and copolymers, vinylidene chloride homopolymers and copolymers, etc.) have been developed having specific chemical and/or mechanical properties for particular end use applications. For example, aqueous interpolymer latexes resulting from the emulsion polymerization of monovinylidene aromatic monomers, such as styrene; diolefins, such as butadiene; and monoethylenically unsaturated carboxylic acids, such as acrylic acid, are known to be particularly useful as film-forming binders for pigments in paper coating applications. See, for example, U.S. Pat. Nos. 3,399,080 and 3,404,116. Such emulsion polymerizations optionally employ conventional seeding procedures for optimum control of the polymerization and to obtain maximum product uniformity (e.g., narrow particle size distribution). The resulting interpolymers are generally film forming at room temperatures (i.e., from about 20° to about 25° C.) and are sometimes referred to as "soft" paper coating binders. Pigmented paper coatings employing such prior art "soft" interpolymer latexes are generally characterized by excellent pigment binding, often expressed in terms of wet pick and dry pick test results. However, such coatings are also characterized by somewhat limited gloss development and by somewhat limited ink receptivity. Naturally improvement of the gloss and ink receptivity in such coatings is an ever-present goal of the industry.

Accordingly, attempts have been made in the prior art to provide improved gloss and ink receptivity while retaining adequate binding and smoothness. Such attempts have included the use of blends as binders of soft (or elastomeric) latexes with hard (or plastomeric) latexes. See, for example, U.S. Pat. No. 3,281,267. In addition the use of plastic pigments in conjunction with, or as a replacement for, conventionally employed mineral pigments has been suggested. While such approaches have provided a measure of improvement in gloss, attendant sacrifices in other desirable coating properties (e.g., binding strength, wet strength, etc.) have been encountered.

More recently the use of "hard" latex binders, which themselves impart a measure of gloss to the coated paper articles, has been suggested for attainment of high gloss paper coatings. Such coatings generally employ latex binders of what are known as hard polymers. Such hard polymers generally have minimum film-forming temperatures in excess of normal room temperatures (e.g., 100° F. or higher). Accordingly, film formation to achieve binding of the pigment particles to each other and to the paper substrate is accomplished for such coatings at elevated temperatures. Such temperatures are controlled to insure only limited (i.e., incomplete) deformation of the hard polymer particles in order to achieve both binding of the pigment particles and the desired coating gloss. See, for example, U.S. Pat. Nos. 3,583,881; 3,634,298 and 3,873,345. Unfortunately, however, such prior art processes for high gloss paper coating are deficient in that (a) the coatings are characterized by relatively low binding strength and (b) the properties of the resulting coated paper product (such as gloss, ink receptivity, smoothness and pigment binding strength) are generally highly sensitive to even relatively small variations (e.g., 5° to 10° C.) in the temperature of the film-forming step (e.g., drying or hot calendering). While sophisticated processing equipment and control systems can be employed to minimize processing temperature variations, such systems are expensive and are generally incapable of completely eliminating such temperature variations and the corresponding variations in product quality.

In view of the foregoing deficiencies in the binders of the prior art paper coatings, it would be highly desirable to provide an improved binder which essentially eliminates these deficiencies, particularly those related to gloss, ink receptivity, binding strength and desirable combinations thereof and especially which reduces the sensitivity of such properties to processing temperature variations.

SUMMARY OF THE INVENTION

In one aspect the present invention is such a binder comprising an aqueous polymer latex, the dispersed polymer particles of which are heterogeneous and individually comprise per 100 parts total weight of the polymer particle: (1) from about 50 to about 90 parts by weight of a soft interpolymer domain comprising (a) from about 30 to about 69 weight percent, based upon the total soft interpolymer, of a monovinylidene aromatic monomer, (b) from about 30 to about 60 weight percent, based upon the total soft interpolymer, of an open chain aliphatic conjugated diene having from 4 to about 9 carbon atoms, and (c) from about 1 to about 10 weight percent, based upon the total soft interpolymer, of a monoethylenically unsaturated carboxylic acid; and (2) from about 10 to about 50 parts by weight of a hard resinous polymer domain.

As used herein, the term "soft interpolymer domain" means that the interpolymer forming such domain has a glass transition temperature equal to or less than room temperature. That is, the composition of such domain is such that a latex of homogeneous polymer particles having the same composition would form continuous adherent films at room temperature (i.e., from about 20° to about 25° C.).

In another aspect this invention is an improved aqueous paper-coating dispersion (i.e., a coating color) comprising (a) a pigment and (b) the polymer latex of the invention as a binder.

In still another aspect this invention is an improved coated paper product comprising a sheet carrying a dried deposit of a coating composition comprising (a) a pigment and (b) a binder comprising the polymer solids of the polymer latex of the invention.

The polymer latexes of the invention have excellent mechanical and storage stability and are readily prepared from relatively inexpensive available monomeric materials. In addition such latexes have minimum film-forming temperatures substantially lower than latexes of homogeneous polymer particles of corresponding overall monomeric composition.

The coating colors of the invention provide coated paper products having an improved combination of properties. For example, such coated paper products generally have properties (e.g., gloss and ink receptivity) superior (a) to those of paper coatings employing latexes of homogeneous polymer particles corresponding in composition to the soft-interpolymer domain and (b) to those of paper coatings employing latexes of heterogeneous polymer particles differing from the latexes of the instant invention in that the hard resinous polymer phase constitutes less than about 10 weight percent of the total polymer particle weight.

In addition, the coating colors of the invention provide coated paper products having properties (e.g., gloss, ink receptivity, smoothness, wet binding strength, dry binding strength, etc.) which are essentially unchanged by relatively wide variations of the temperature in which film formation is achieved (e.g., drying or calendering).

Further, the coating colors of the invention provide coatings having properties which are at least equivalent to (and generally superior to) those of coatings employing latexes of homogeneous polymer particles of corresponding overall monomer content. Such equivalent or superior properties are, in addition, generally attainable with less severe processing conditions (e.g., lower processing temperatures, fewer calendering steps, lower calendering pressures, etc.). That is, the coating colors of the invention provide generally improved ease of finishing to obtain equivalent or superior coating properties.

DETAILED DESCRIPTION OF THE INVENTION

The polymer particles of the latex of the invention are broadly characterized as generally heterogeneous, having a soft polymer domain and a hard polymer domain.

As used herein, the term "domain" refers to discrete regions within the aforementioned heterogeneous polymer particle which are either the aforementioned hard resinous polymer or the aforementioned soft interpolymer.

The distribution within a heterogeneous polymer particle of the soft interpolymer domain and the hard resinous polymer domain can vary. For example, the heterogeneous polymer may have only two distinct regions, e.g., a hard resinous polymer core circumscribed by a soft interpolymer shell or mutually exclusive hemispherical soft and hard regions. On the other hand, the heterogeneous particle may have multiple regions of one or both components. For example, a generally spherical continuous region of one polymer may have several discrete regions of the other polymer dispersed in, or residing on the surface of, the continuous region. Alternatively, the heterogeneous particle may have an essentially continuous web-like region of one polymer that has its interstices filled with the other polymer.

The size of the aforementioned heterogeneous polymer particles can vary. However, for optimum coating characteristics, it is generally desirable that such particles have an average diameter of from about 0.08 to about 0.3, preferably from about 0.15 to about 0.25, micrometers.

The polymer latexes of the present invention are advantageously prepared by emulsion polymerizing from about 50 to about 90, preferably from about 50 to about 85, most preferably from about 60 to about 80, parts by weight (based upon 100 parts by weight of total heterogeneous polymer product) of a monomer charge comprising a monovinylidene aromatic monomer, an open chain aliphatic conjugated diene and a monoethylenically unsaturated carboxylic acid in an aqueous medium comprising from about 10 to about 50, preferably from about 15 to about 50, most preferably from about 20 to about 40, parts by weight (based upon 100 parts by weight of heterogeneous polymer product) of dispersed hard resinous polymer particles. Accordingly, the amount of soft interpolymer domain in 100 parts by weight of the resulting heterogeneous polymer particles is from about 50 to about 90, preferably from about 50 to about 85, most preferably from about 60 to about 80, parts by weight and the amount of hard resinous polymer domain in such particles is corresponding from about 10 to about 50, preferably from about 15 to about 50, most preferably from about 20 to about 40, parts by weight.

By the term "monovinylidene aromatic monomer", it is intended to include those monomers wherein a radical of the formula

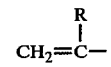

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene, α-methylstyrene, ortho-, meta-, and para-methylstyrene, ortho-, meta- and para-ethylstyrene, o,p-dimethylstyrene, o,p-diethylstyrene, isopropylstyrene, o-methyl-p-isopropylstyrene, p-chlorostyrene, p-bromostyrene, o,p-dichlorostyrene, o,p-dibromostyrene, vinylnaphthalene, diverse vinyl (alkylnaphthalenes) and vinyl (halonaphthalenes), and comonomeric mixtures thereof. Because of considerations such as cost, availability, ease of use, etc., styrene and vinyltoluene are preferred and styrene is especially preferred as the monovinylidene aromatic monomer. Such monovinylidene aromatic monomer constitutes from about 30 to about 69, preferably from about 50 to about 63 weight percent of the aforementioned monomer charge employed in the practice of this invention. Accordingly such monovinylidene aromatic monomer constitutes corresponding weight percentages of the soft interpolymer domain of the heterogeneous polymer particles.

By the term "open chain aliphatic conjugated diene" having from 4 to about 9 carbon atoms it is meant to include, typically, 1,3-butadiene, 2-methyl-1,3-butadiene, 2,3-dimethyl-1,3-butadiene, pentadiene, 2-neopentyl-1,3-butadiene, and other hydrocarbon analogs of 1,3-butadiene, and, in addition, the substituted 1,3-butadienes, such as 2-chloro-1,3-butadiene, 2-cyano-1,3-butadiene, the substituted straight chain conjugated pentadienes, the straight chain and branched chain conjugated hexadienes, other straight and branched chain conjugated dienes having from 4 to about 9 carbon atoms, and comonomeric mixtures thereof. The 1,3-butadiene hydrocarbon monomers such as those mentioned hereinbefore provide interpolymers having particularly desirable properties and are therefore preferred. The cost, ready availability and the excellent properties of interpolymers produced therefrom makes 1,3-butadiene the most preferred open chain aliphatic conjugated diene. Such open chain aliphatic conjugated dienes constitute from about 30 to about 60, preferably from about 35 to about 45 weight percent of the aforementioned monomer charge employed in the practice of this invention. Accordingly such open chain aliphatic conjugated dienes constitute corresponding weight percentages of the soft interpolymer domain of the heterogeneous polymer particles.

The monoethylenically unsaturated carboxylic acid employed in the practice of the invention can vary. Such acids must be copolymerizable with the other monomers of the monomer charge employed. Examples of such acids include itaconic acid, acrylic acid, methacrylic acid, fumaric acid, maleic acid, vinyl benzoic acid and isopropenyl benzoic acid. Preferred monoethylenically unsaturated carboxylic acids include acrylic acid, methacrylic acid, itaconic acid, fumaric acid and maleic acid. Comonomeric mixtures of such monoethylenically unsaturated acids can be employed if desired. Such acids can be introduced to the polymerization as such or they can be formed in situ in an aqueous polymerization medium by introducing a hydrolyzable derivative of such acid (e.g., salts or the anhydride of the desired acid) into such aqueous medium. The aforementioned monoethylenically unsaturated carboxylic acid constitutes from about 1 to about 10, preferably from about 2 to about 5 weight percent of the aforementioned monomer charge employed in the practice of this invention. Accordingly such monoethylenically unsaturated carboxylic acid constitutes corresponding weight percentages of the soft interpolymer domain of the heterogeneous polymer particles.

In addition to the aforementioned monomers, there can optionally be employed a small amount (e.g., from about 1 to about 20, preferably about 1 to about 15, most preferably from about 1 to about 10, weight percent of the aforementioned monomer charge) of other copolymerizable monomers. Suitable optional monomers include for example hydroxyalkylacrylates wherein the alkyl group contains from 2 to about 4 carbon atoms such as 2-hydroxyethyl acrylate or 3-hydroxypropyl acrylate; alkyl acrylates wherein the alkyl group contains from 1 to about 18 carbon atoms, such as methyl acrylate, ethyl acrylate, propyl acrylate, 2-ethylhexyl acrylate, etc.; alkyl methacrylates such as methyl methacrylate, ethyl methacrylate, propyl methacrylate, n-butyl methacrylate, and similar alkyl methacrylates wherein the alkyl group contains from 1 to about 18 carbon atoms; acrylonitrile; methacrylonitrile; and similar monoethylenically unsaturated monomers.

The hard resinous polymer particles which are dispersed in the aqueous medium in which the hereinbefore defined monomer charge is emulsion polymerized can be particles of any polymer having a glass transition temperature of at least about 85° C., preferably at least about 100° C. Such hard polymers include for example homopolymers and hard interpolymers of the hereinbefore defined monovinylidene aromatic monomer (e.g., polystyrene, poly(vinyltoluenes), poly(vinylnaphthalenes), styrene-acrylonitrile copolymers, styrene-methacrylonitrile copolymers, styrene-methyl methacrylate copolymers, styrene-ethyl methacrylate copolymers, etc.); hard acrylic resins (e.g., poly(methyl methacrylate), poly(2-chloroethyl methacrylate), poly(isopropyl methacrylate), poly(phenyl methacrylate), polyacrylonitrile, polymethacrylonitrile, etc.); and the like. Because of considerations such as polymer properties, availability and compatibility with the polymer formed by polymerizing the aforementioned monomer charge, homopolymers and copolymers of styrene, acrylonitrile, methacrylonitrile, and methyl methacrylate are preferred. By virtue of the low cost and availability of styrene, polystyrene and copolymers having styrene as the predominant monomer are especially preferred for use as the hard polymer particles. Optionally, a minor amount (e.g., from about 1 to about 10, preferably from about 2 to about 5, weight percent) of a monoethylenically unsaturated carboxylic acid such as those described hereinbefore can be employed in the hard polymer to affect reactor stability in the preparation of such hard polymer and colloidal stability of the resulting hard polymer latex. In addition, a minor amount (e.g., from about 0.1 to about 5, preferably from about 0.5 to about 2, weight percent) of a cross-linking monomer such as divinylbenzene, ethylene dimethacrylate, etc. can optionally be employed to obtain hard resinous polymers having increased glass transition temperatures.

The average particle size (i.e., diameter) of the hard resinous particle employed is typically from about 45 to about 80, preferably from about 55 to about 80, most preferably from about 60 to about 75, percent of the average particle size desired for the heterogeneous particles in the latex of the invention. Accordingly the average diameter of such hard particles is generally in the range of from about 0.035 to about 0.24, preferably from about 0.045 to about 0.24, most preferably from about 0.05 to about 0.23, micrometers.

The aforementioned hard resinous polymer particles can be introduced into the aqueous polymerization medium in the form of a previously prepared charge of hard resinous powder or in the form of an aqueous latex of such hard polymer. Alternatively, the monomer for the hard resinous polymer particles can be emulsion polymerized in situ prior to polymerization of the aforementioned monomer charge for the soft polymer domain. In this latter instance the overall polymerization comprises a 2-stage emulsion polymerization wherein the hard resinous polymer particles are formed in the first polymerization stage and the monomer charge for the soft interpolymer domain is polymerized in the presence of such hard resinous polymer particles in the second polymerization stage. U.S. Pat. No. 2,962,465 describes a 2-stage emulsion polymerization process which is generally suitable for preparing the latex of the present invention.

The polymerization of the hard resinous polymer to form the dispersed particles can be accomplished by known procedures for polymerization in aqueous emulsion. Optionally conventional seeding procedures can be employed to aid in control of the polymerization and in achieving the desired average particle size and particle size distribution for the hard resinous polymer particles. Typically such seed is employed in amounts corresponding to from about 0.1 to about 1 weight percent. Generally such seed ranges in size from about 10 to about 20 percent of the diameter of the hard resinous polymer particles to be formed. As with the hard resinous particles themselves, the seed latex for such hard resinous particles can constitute a previously prepared latex or polymer powder or it can be prepared in situ. In this latter instance the overall polymerization to form the latex of the invention can be viewed as a 3-stage polymerization in which (a) the first stage comprises preparation of the initial seed, (b) the second stage comprises preparation of the dispersed hard resinous polymer particles, and (c) the third stage comprises polymerization of the aforementioned monomer charge in the presence of such hard resinous particles to form the objective heterogeneous polymer particles. The nature (i.e., monomeric composition) of the seed latex can vary so long as it does not coagulate during formation of the hard resinous polymer particles. However, it is often desirable that the seed employed in the preparation of the aforementioned hard resinous polymer particles be of a monomeric composition substantially the same as that of the hard resinous polymer particles.

In the preparation of the hard resinous polymer particles, the monomer or comonomers (and the aforementioned optional seed) to be employed for the hard resinous polymer are typically dispersed, with agitation sufficient to emulsify the mixture, in an aqueous medium which may contain a known free radical polymerization catalyst and/or a known emulsifying agent (i.e., surfactant) as well as other ingredients conventionally employed in the art as emulsion polymerization aids.

Suitable free radical polymerization catalysts for the aforementioned hard resinous polymer formation include those already known to promote emulsion polymerization. Among such catalysts are water-soluble oxidizing agents such as organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.) and catalysts which like redox catalysts are activated in the water phase, for example, by a water-soluble reducing agent.

Such catalysts are employed in an amount sufficient to cause polymerization (i.e., in a catalytic amount). As a general rule an amount ranging from about 0.01 to about 5 weight percent based upon the total monomer to be polymerized is sufficient. Alternatively, other free radical producing means, such as exposure to activating radiations, can be employed rather than heat and/or catalytic compounds to activate the polymerization.

Suitable emulsifying agents which can be employed in the hard resinous polymer polymerization include anionic, cationic, and nonionic emulsifiers customarily used in emulsion polymerization. Usually at least one anionic emulsifier is included and one or more nonionic emulsifiers can also be present. Representative types of anionic emulsifiers are the alkyl aryl sulfonates, alkali metal alkyl sulfates, the sulfonated alkyl esters, the fatty acid soaps and the like. Specific examples of these well known emulsifiers include dodecylbenzene sodium sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate. Such emulsifying agents can be employed in varying amounts so long as adequate emulsification is achieved to provide hard resinous particles of the desired particle size and particle size distribution. For example, when a seed latex is employed in the aqueous medium to be used in the hard resinous polymer polymerization, suitable control of particle size and distribution generally can be conveniently achieved without addition of an emulsifying agent to the aqueous medium. However, as a general rule, an amount ranging from about 0.01 to about 5 weight percent, based upon the total monomer to be polymerized, is advantageously employed.

Other ingredients (e.g., acids, salts, chain transfer agents, chelating agents, etc.) known in the art to be useful for various specific purposes in emulsion polymerization can also be employed in preparation of the hard resinous polymer. For example, when the polymerizable constituents for the hard resinous polymer include a monoethylenically unsaturated carboxylic acid comonomer, polymerization under acidic conditions (e.g., the aqueous media having a pH value of from about 2 to about 7, preferably from about 2 to about 5) is preferred. In such instances the aqueous medium can include acids and/or salts to provide the desired pH value and possibly a buffered system. On the other hand, when a monoethylenically unsaturated carboxylic acid monomer is not employed the pH of the aqueous medium can conveniently range from about 2 to about 10.

The manner of combining the aforementioned ingredients can vary. For example, various known monomer feed methods (such as continuous monomer addition, incremental monomer addition or addition in a single charge of the entire amount of monomer for the hard resinous polymer) can be employed. Similarly the entire amount of the aqueous medium (or specific ingredients thereof) can be present in the polymerization vessel before introduction of the monomer or the comonomer mixture. Alternatively, the aqueous medium (or a portion thereof) can be added (continuously or incrementally) during the course of the polymerization.

Polymerization to form the hard resinous polymer particles is generally initiated by heating the emulsified mixture (with continued agitation) to a temperature usually between about 50° and about 110° C., preferably between about 70° and about 100° C. Polymerization is continued by maintaining the emulsified mixture at the selected temperature until the desired conversion of monomer to polymer has been reached.

Following the polymerization to form the hard polymer particles, the latex optionally can be filtered to remove any precoagulum and then stabilized to storage (pending subsequent use as the dispersed hard resinous particles in the aqueous interpolymerization) by the addition of a small amount of known stabilizer. Preferably the filtering and intermediate stabilization steps for the hard polymer latex are eliminated, by proceeding directly to the polymerization of the monomer charge for the soft interpolymer domain.

The interpolymerization of the monovinylidene aromatic monomer, the open chain aliphatic conjugated diene and the monoethylenically unsaturated carboxylic acid in the presence of the aforementioned hard polymer particles can be accomplished pursuant to the emulsion polymerization procedures conventionally employed in the preparation of homogeneous interpolymers from such monomers. However, it is preferable that no (or only small amounts of) additional emulsifying agent (i.e., over and above that retained in the hard resinous polymer latex from its preparation) be employed. This feature is desirable in order that the majority of the interpolymerization occurs on, in, or around the existing dispersed hard polymer particles rather than initiating substantial amounts of homogeneous soft interpolymer particles. Thus, typically the monomer charge for the soft interpolymer domain is dispersed (with agitation) in an aqueous medium containing the dispersed hard resinous polymer particles and polymerized (with continued agitation) in generally the same manner (and with the same optional polymerization aids) as hereinbefore described for the preparation of the hard resinous polymer particles. It is preferable in the formation of the soft interpolymer domain to employ a conventional chain transfer agent such as bromoform, carbon tetrachloride, long chain mercaptans (e.g., lauryl mercaptan, dodecyl mercaptan, etc.), or other known chain transfer agents. Conventional amounts (e.g., from about 0.1 to about 30 weight percent based on the total monomer charge) of such chain transfer agents are typically employed in such preferred embodiments. In addition, since the monomer charge for formation of the soft interpolymer domain includes a monoethylenically unsaturated carboxylic acid, the aqueous medium is preferably acidic (i.e., having a pH value of from about 2 to about 7, especially from about 2 to about 5). Accordingly, the aqueous medium can contain acids and/or salts to provide the desired pH value and possibly a buffered system.

The manner of combining the ingredients for the soft interpolymer domain can vary. However, in order to obtain maximum product uniformity, it is preferable that substantially all of the aforementioned hard resinous polymer particles are dispersed in the polymerization vessel before polymerization of the soft interpolymer is initiated.

Following polymerization, the solids content of the resulting aqueous heterogeneous polymer latex can be adjusted to the level desired by adding water thereto or by distilling water therefrom. Generally such desired level of polymeric solids content is from about 20 to about 65, preferably from about 45 to about 60, weight percent on a total weight basis.

Suitable particle sizes can generally be achieved directly from the polymerization. However, screening of the resulting latex to remove particles outside the desired size range and to thus narrow the particle size distribution can be optionally employed.

For various applications, it is sometimes desirable to have small amounts of certain known additives incorporated in the latex. Typical examples of such additives are surfactants, bacteriocides (e.g., formaldehyde), neutralants, antifoamers, etc. Such additives can be incorporated into the latexes of the invention in a conventional manner and at any convenient point in the preparation of such latexes.

The heterogeneous polymer latexes of the invention are particularly advantageous in the preparation of improved coating colors for use in paper coating applications.

The term "coating color" is often applied in the art to aqueous paper-coating compositions comprising an adhesive (commonly called a "binder") and a pigment. In the "coating colors" of the invention, the adhesive and the pigment are mixed in such proportions that, for each 100 parts by weight of dry pigment, from about 5 to about 30 (preferably from about 10 to about 30) parts by weight, dry basis, of adhesive are present in the mixture. The latex disclosed herein can be the sole adhesive (or binder) employed in the coating colors of this invention or other adhesives known in the art (e.g., other latexes known to be useful as adhesives or natural binders such as casein, protein, starch, etc.) can be used in conjunction with the latex of the invention if desired. Generally from about 20 to about 100 percent, preferably from about 50 to about 100 percent, most preferably from about 70 to about 100 percent, by weight of the adhesive in a coating color of this invention is the heterogeneous polymer latex described herein, the percentages being on a dry solids basis.

The total solids content of the coating color of the invention (a) does not differ substantially from that in prior art coloring colors, (b) depends largely upon the equipment being used and (c) usually ranges from about 30 percent to about 65 percent by weight based upon the total coating color weight.

Pigments which can be employed in the improved paper-coating compositions of the invention include known mineral pigments, known plastic pigments, and mixtures thereof.

Any mineral pigments suitable for use in conventional mineral pigmented paper coating compositions can be employed in the coating composition of the invention. Examples of suitable mineral pigments for use in the coating compositions of the invention thus include finely divided clays (especially of the kaolin type), calcium carbonate, titanium dioxide, satin white, etc. Other materials such as talc, blanc fixe, ochre, carbon black, aluminum powder or platelets, and other pigmentary or filler material can be employed in minor amounts in conjunction with the aforementioned mineral pigments.

Plastic pigments suitable for use in the aqueous paper-coating composition of the invention include those known to be useful in plastic pigmented paper coatings, such as those described in U.S. Pat. No. 3,949,138. Such plastic pigments are generally characterized as plastic, polymeric particles which (a) have a number average particle diameter of from about 0.3 to about 0.8 micrometers and (b) are not film-forming at temperatures and pressures selected to dry or finish the coated paper. By "nonfilm-forming" it is meant that the plastic particles do not coalesce to form a film at ambient temperature or at temperatures and pressures selected to dry or finish the coated article. Other plastic pigments suitable for use in the aqueous paper-coating composition of the invention include those described in U.S. Pat. Nos. 3,293,144 and 3,988,522.

The coating colors of the invention can optionally contain other additives such as thickeners (e.g., alginic acid or carboxymethylcellulose) and curing agents (e.g., melamine formaldehyde resins, urea formaldehyde resins and glyoxal) to achieve specific coating properties. When thickeners and/or curing agents are employed, they generally constitute, individually, from about 1 to about 5 percent of the total binder weight on a dry basis.

The aforementioned components can be combined to form the coating colors of the invention in any convenient manner. As a general rule, however, it is convenient and preferred to disperse the pigment (or pigment mixture) and other powdery components in water and adjust the pH of the resulting dispersion to a value between about 6 and about 9 before mixing such dispersion with the latex of the invention. Tetrasodium pyrophosphate is often used as a dispersing aid, particularly where mineral pigments constitute all or a portion of the pigment or pigment mixture. In that case additional pH adjustment is generally not required. However, (a) if no other additives are present while forming the pigment dispersion or (b) if agents which are acidic or which require alkaline pH for effectiveness are used, such as sodium hexametaphosphate, a pH adjustment is generally made with alkalizing agents such as sodium hydroxide, potassium hydroxide, ammonium hydroxide and the like.

The coating color of the invention is conveniently applied to the paper by conventional means such as letter-press print roll coater, offset roll coater, size press, air knife or blade coater.

After application, the coating is dried by any convenient method. Generally, however, drying is accomplished by causing a current of air at a velocity of up to about 10,000 feet per minute to impinge upon the surface of the coated material. The temperature of the air may vary up to about 320° C. but the duration of contact is such that the coating is not heated to above about 100° C. and preferably not above the glass transition temperature characteristic of the hard resinous polymer domain of the latex of the invention which is employed.

After drying, the coated paper product can be finished pursuant to processes conventionally employed in the art such as gloss calendering, super calendering and the like. It is worthy of note, however, that a unique advantage of using paper coatings employing the latexes of the invention is that the desired properties developed in such finishing operations are generally obtained with less severe processing conditions. Thus, for example, finishing can generally be accomplished with fewer processing steps and/or at reduced temperatures and/or at reduced pressures without sacrifice in desired coating qualities (e.g., gloss, ink receptivity, binding strength, smoothness, etc.). Such "easy finishing feature" thus permits development of optimum coating properties with minimum detriment to the coated paper product, such as reduced caliper or increased stiffness. In addition, use of the latexes of the invention also renders coating properties less sensitive to fluctuations in the processing temperatures (e.g., operational upsets, variations characteristic of automatic temperature controllers, etc.) often encountered in conventional drying and finishing processes.

The resulting coatings exhibit good adhesion to paper and to solid additives and the coated papers can be printed in a conventional manner.

The present invention is further illustrated, though not intended to be limited by, the following examples.

EXAMPLE 1

Latexes and Paper Coatings of Styrene/Butadiene/Acrylic Acid/Fumaric Acid Polymerized in the Presence of Styrene/Acrylic Acid/Fumaric Acid Copolymer Particles A two-stage latex is prepared having 20 parts by weight of a 99:1 weight ratio styrene/acrylic acid comonomer charge polymerized in the first stage and 79 parts by weight of a 57/40/3 weight ratio styrene/butadiene/acrylic acid comonomer charge polymerized in the second stage. The fumaric acid monomer (1 part by weight) is added with the hereinafter described initial aqueous medium. A portion of the fumaric acid monomer polymerizes in the first stage and the remainder polymerizes in the second stage.

The first stage polymerization is externally seeded with a 0.025 micrometer average diameter 97:3 weight ratio styrene/acrylic acid copolymer latex in an amount corresponding to 0.2 part by weight (dry basis) per 100 parts by weight of the total monomer to be polymerized in the two polymerization stages.

An initial aqueous medium is employed which contains (in parts by weight per 100 parts by weight of the total monomer) 1 part of fumaric acid monomer, 62 parts of water, 0.1 part of sodium dodecyldiphenyl oxide disulfonate, 0.01 part of chelating agent (i.e., the pentasodium salt of diethylenetriamine penta-acetic acid) and the aforementioned external seed.

An additional aqueous stream containing (by weight per 100 parts by weight of total monomer in both stages) a total of 40 parts deionized water, 1 part of sodium dodecyldiphenyl oxide sulfonate, 0.15 parts of sodium hydroxide and 0.5 part of sodium persulfate is added to the aforementioned initial aqueous medium continuously over the first five hours of the polymerization.

Both polymerization stages are conducted at 90° C. and continuous monomer addition is employed in each instance. The first stage monomer charge is added at a constant rate over a ¾ hour period and a one hour cookdown (at 90° C.) is then provided before commencing addition of the second monomer charge. Following the first stage cookdown, the second stage monomer charge (having admixed therewith 2.5 parts by weight of bromoform per 100 parts by weight of butadiene monomer) is added at a constant rate over a 3¼ hour period.

Following complete addition of the second stage monomer charge, a 3½ hour cookdown is provided after which the latex is steam-stripped to remove residual monomers and volatile organic substances. The resulting latex contains 47.2 percent polymer solids having an average diameter of 0.2 micrometer.

The latex is then compounded into a coating composition with Number 1 clay pigment and water in a ratio of 20 parts by weight latex solids per 100 parts by weight of clay to form an aqueous paper coating composition having about 60 weight percent total solids.

A coating of the resulting composition is applied, at about 7 pounds per 3,300 sq. ft. ream, (i.e., 0.01 Kg/sq. meter) to one surface of a general-purpose medium weight base stock. The coating is dried, supercalendered at 1,200 pounds per linear inch (i.e., 214.5 Kg/cm) and 150° F. (i.e., 65.6° C.), and its properties were evaluated.

In the same manner, comparative coatings are prepared and evaluated using coating compositions employing in one instance a widely-used styrene/butadiene type latex (commercially available as DL-620 from The Dow Chemical Company) and in another instance a polyvinyl acetate latex.

In this example and subsequent examples, the following test methods are employed to evaluate the paper coating properties.

The TAPPI 75° gloss measurements are made pursuant to TAPPI Standard Test T-480-ts-65 using a Gardener multi-angle glossmeter. The K&N ink receptivity is determined pursuant to TAPPI Standard RC-19 by placing a smear of K&N testing ink on the coated sheet for two minutes after which excess ink is removed and the brightness of the inked area is measured and compared to the brightness before inking. The receptivity value is reported as a percent drop in sheet brightness with larger percentage drop indicating better ink receptivity.

Pigment binding strength is determined by IGT Pick testing and by IGT Wet Pick testing. A measure of dry binding strength is provided by IGT Pick testing pursuant to TAPPI Standard T-499. A measure of wet binding strength is provided by IGT Wet Pick testing, again pursuant to TAPPI Standard T-499 except that the test strip is predampened via a rubber squeegee prior to printing and the test strip is compared against standards.

IGT Wet Trap is the ability of the coated paper to dissipate surface moisture and thereby to facilitate greater ink transfer. The test procedure is pursuant to TAPPI Standard T-499 except that a single drop of fountain solution or some other aqueous solution is placed on the inked disc before tripping the machine. As the ink disc rotates, it spreads a thin film of such solution on the sheet directly ahead of the ink. Brightness readings are then taken on the printed strip. Low brightness readings (indicating increased ink transfer) are desirable.

The results of the coating evaluation are summarized in Table I.

TABLE I
COATED PAPER PROPERTIES

| | Coating Composition Binder | | |
|---|---|---|---|
| Coating Property | Example 1 2-Stage Latex | DL-620* | Polyvinyl Acetate* |
| Dry Pick[1] (ft/min) | 285 | 210 | 285 |
| Wet Trap | | | |
| 75:25 Water/Isopropyl Alcohol | 78.5 | 84.5 | 82.0 |
| Fountain Solution | 28.0 | 58.0 | 44.5 |
| K&N Ink Receptivity (% Drop In Brightness) | 16.6 | 11.4 | 19.8 |
| TAPPI 75° Gloss | | | |
| Initial (As Coated and Dried) | 25.4 | 23.5 | 20.0 |
| 1 Calender Nip | 68.0 | 59.6 | 48.8 |
| 2 Calender Nips | 75.7 | 65.7 | 56.0 |
| 3 Calender Nips | 77.0 | 70.2 | 62.4 |
| 4 Calender Nips | 79.2 | 72.2 | 64.2 |

*Not an example of the invention
[1]IGT tack grade number 7 ink and 50 Kg printing pressure As is apparent from Table I, the coating employing the 2-stage latex of the invention compares very favorably with the coating employing the DL-620 latex and the coating employing the polyvinyl acetate latex. Specifically, the gloss data in Table I shows that the 2-stage latex based coating of the invention exhibits gloss (both initially and after a given number of calendering steps) which is superior to both the DL-620 and the polyvinyl acetate based coatings. Further, the gloss data illustrates the "easy finishing" properties of the 2-stage latex composition. That is, after one calendering nip the gloss of the coating employing the 2-stage latex of the invention is superior (a) to that of the DL-620 composition after 2 nips and (b) to that of the polyvinyl acetate composition after 4 nips. Similarly, the gloss of the 2-stage latex based coating is higher after 2 calendering nips than that of the other coatings after 4 nips.

The wet trap data in Table I shows the coating of the invention to have better ability to absorb moisture and to thereby facilitate ink transfer than do the comparative coatings.

The dry pick data in Table I shows the coating of the invention to exhibit good pigment binding.

The K&N ink receptivity data in Table I indicates that the coating of the invention (a) to exhibit ink receptivity superior to the DL-620 latex based coating and (b) to compare favorably with the polyvinyl acetate systems which are generally recognized as having excellent ink receptivity.

EXAMPLE 2

Latexes and Paper Coatings of Styrene/Butadiene/Acrylic Acid/Fumaric Acid Polymerized in the Presence of Styrene/Fumaric Acid Copolymer Particles A 2-stage latex is prepared having 18 parts by weight of a styrene charge polymerized in the first stage and 81 parts by weight of a 55.8/40.5/3.7 weight ratio styrene/butadiene/acrylic acid comonomer charge polymerized in the second stage. The fumaric acid monomer (1 part by weight) is added in conjunction with the initial aqueous medium. A portion of it polymerizes in the first stage and the remainder polymerizes in the second stage.

The first stage is externally seeded with a 0.025 micrometer average diameter 97:3 weight ratio styrene/acrylic acid copolymer latex in an amount corresponding to 0.3 part by weight (dry basis) per 100 parts by weight of total monomer.

The polymerization process of Example 1 is employed except that (a) the sodium dodecyldiphenyl oxide disulfonate is employed in the amount 0.1 part per 100 parts of total monomer and it is employed in the initial aqueous medium instead of in the continuously added aqueous stream and (b) the 1 hour cookdown of the process of Example 1 (between the first and second stage polymerizations) is eliminated. In addition, carbon tetrachloride is employed as the chain transfer agent in an amount corresponding to 12.2 parts by weight per 100 parts by weight of butadiene monomer in place of the bromoform of Example 1.

Following the polymerization, the pH of the latex is adjusted to 5.2 with ammonium hydroxide. The latex is then steam-stripped and formaldehyde (500 ppm) is added as a bacteriocide.

The latex is then compounded with Number 1 clay in a ratio of 18 parts latex solids per 100 parts of clay to form an aqueous coating paper composition having about 50 weight percent total solids.

A typical Fourdrinier board is double-coated using a base coat containing 16 parts by weight (dry basis) of a commonly used, commercially available styrene/butadiene type latex (DL-620) and 100 parts by weight of Number 2 clay. The base coating is applied at 60 percent total solids content, at a base coating weight of 2.0 lbs/1,000 sq. ft. (i.e., 0.01 Kg/square meter) and using a blade coater. The top coat is applied using an air knife coater and the coating color for the top coat is the above-described compounded composition of Example 2.

The double-coated Fourdrinier board is calendered at 200 pounds per linear inch (i.e., 35.7 Kg/cm.) and 325° F. (i.e., 162.8° C.) and properties of the resulting coated Fourdrinier board are determined.

In the same manner, comparative Fourdrinier board coatings are prepared and evaluated using (in the top coat) coating compositions employing, in one instance, DL-620 latex and, in another instance, a polyvinyl acetate latex.

The results of the coating evaluations are summarized in Table II.

TABLE II
COATED FOURDRINIER BOAD PROPERTIES

| | Coating Composition Binder | | |
|---|---|---|---|
| Coating Property | Example 2 2-Stage Latex | DL-620* | Polyvinyl Acetate* |
| Dry Pick | Good | Good | Good |
| Wet Pick | 75 | 80 | 80 |
| Wet Trap | 40 | 75 | 45 |
| K&N Ink Receptivity (% Drop in Brightness) | 27 | 17 | 35 |
| TAPPI 75° Gloss | | | |
| Initial | 53 | 42 | 33 |
| 1 Calender Nip | 68 | 58 | 48 |
| 2 Calender Nips | 71 | 63 | 52 |
| Glueability | Adequate | Adequate | Adequate |

*Not an example of the invention

From the data in Table II, it is again apparent that the coating employing the 2-stage latex of the invention has gloss properties (initially and after calendering) superior to those of the comparative coatings. The coating of the invention is also seen to compare very favorably to the comparative coatings in terms of the remaining properties.

EXAMPLES 3 & 4

Latexes and Paper Coatings of Styrene/Butadiene/Fumaric Acid/Acrylic Acid/2-Hydroxyethyl Acrylate Polymerized in the Presence of Styrene/Fumaric Acid Copolymer Particles Two 2-stage latexes are prepared, each having styrene/fumaric acid copolymer formed in the first stage and a styrene/butadiene/fumaric acid/acrylic acid/2-hydroxyethyl acrylate copolymer formed in the second stage. The overall monomeric composition of both latexes is 62.3 percent styrene; 33.3 percent butadiene; 1.5 percent fumaric acid; 0.3 percent acrylic acid; and 2.6 percent 2-hydroxyethyl acrylate, all percentages being by weight based on total monomer. The fumaric acid in each instance is added in the initial aqueous polymerization medium. A portion of it polymerizes in the first stage and the remainder polymerizes in the second stage.

In the latex of Example 3, the first-stage styrene charge constitutes 10 parts by weight and the second-stage monomer charge constitutes 88.5 parts by weight, both based on 100 parts by weight of total monomer. The remaining 1.5 parts of monomer is fumaric acid in the initial aqueous medium. The second-stage monomer charge is a 59.1/37.62/0.34/2.94 weight ratio comonomer mixture of styrene, butadiene, acrylic acid and 2-hydroxyethyl acrylate, respectively.

In the latex of Example 4 the first-stage styrene charge constitutes 15 parts by weight and the second-stage monomer charge constitutes 83.5 parts by weight, both based on 100 parts by weight of total monomer. The remaining 1.5 parts of monomer is fumaric acid in the initial aqueous medium. The second-stage monomer charge is a 56.6/39.9/0.4/3.1 weight ratio comonomer mixture of styrene, butadiene, acrylic acid and 2-hydroxyethyl acrylate, respectively.

The polymerizations are conducted pursuant to the procedure of Example 1 using carbon tetrachloride in an amount corresponding to 9.3 parts by weight per 100 parts by weight of butadiene monomer in place of the bromoform chain transfer agent of Example 1. Coating compositions employing the resulting latexes are prepared, applied and evaluated, also according to the procedures of Example 1 except that 18 parts (rather than 20) by weight of latex solids per 100 parts by weight of Number 1 clay is employed.

For comparison with the coatings of the invention, a coating composition employing a homogeneous (i.e., single-stage) styrene/butadiene/fumaric acid/acrylic acid/2-hydroxyethyl acrylate copolymer (corresponding in overall monomer composition to that of the polymers of Examples 3 and 4) is prepared, applied and evaluated.

The results are summarized in Table III.

TABLE III
COATED PAPER PROPERTIES

| Coating Property | Example 3 (10 wt % first stage) | Example 4 (15 wt % first stage) | Control* (single stage) |
|---|---|---|---|
| TAPPI 75° Gloss | | | |
| Initial | 20 | 22 | 20 |
| 1 Calender Nip[1] | 58.7 | 61.0 | 57.2 |
| 2 Calender Nips | 66.8 | 67.7 | 64.7 |
| 3 Calender Nips | 69.7 | 71.6 | 68.1 |
| 4 Calender Nips | 71.8 | 73.7 | 69.9 |
| K&N Ink Receptivity (% Drop in Brightness) | 17.5 | 18.5 | 16.2 |

*Not an example of the invention
[1]Calendered at 1,200 pli (214.5 Kg/cm) and 150° F (65.6° C).

From the data in Table III, it is apparent that improved gloss is obtained at first-stage hard polymer levels as low as 10 weight percent based upon the total 2-stage polymer weight. It is also apparent that the magnitude of the improvement in gloss increases as the amount of the first-stage polymer is increased relative to the amount of the second-stage polymer. The "easy" finishing feature of the coating compositions of the invention is again apparent in that the gloss obtained in Examples 3 and 4 after three calendering steps is equivalent (Ex. 3) to, or better than, (Ex. 4) that of the control after 4 calendering steps.

EXAMPLES 5-17

Latexes and Paper Coatings Comprising Styrene/Butadiene/Acrylic Acid Interpolymer Polymerized in Aqueous Medium Containing Various Amounts of Styrene/Acrylic Acid Copolymer Particles Two-stage latexes (i.e., heterogeneous polymer particles) are prepared having varying amounts of a 99:1 weight ratio styrene/acrylic acid copolymer formed in the first-stage emulsion polymerization relative to the amount of styrene/butadiene/acrylic acid interpolymer formed in the second-stage emulsion polymerization and having varying particle sizes. In addition, single-stage (i.e., homogeneous polymer particles) styrene/- butadiene acrylic acid interpolymers of various compositions are prepared for comparison.

The single-stage polymerizations and the first stage of the 2-stage polymerizations are externally seeded with a small particle size (i.e., 0.025 micrometer average diameter) seed latex of polymerized styrene (97 percent by weight) and acrylic acid (3 percent by weight) in an amount corresponding to between about 0.2 and about 0.9 part by weight (dry basis) per 100 parts by weight of total monomer to be polymerized. The polymerizations are conducted at 90° C. in an initial aqueous medium containing (per 100 parts of total monomer by weight) about 62 parts water by weight, about 0.1 part by weight of sodium dodecyldiphenyl oxide disulfonate, 0.01 part by weight of a chelating agent (the pentasodium salt of diethylenetriamine penta-acetic acid) and the aforementioned external seed. Continuous monomer addition is employed for both the 2-stage polymerizations (both stages) and the single-stage polymerization. The total monomer addition time for the 2-stage polymerization is 4 hours with the first and second-stage monomer addition time increments varying proportionately with the monomer distribution (i.e., the first-stage to second-stage ratio) in the respective stages. Approximately the same monomer feed rate (in terms of weight per unit time) is employed in the first and second-polymerization stages. A one hour cookdown (at 90° C.) period is provided between the first and second-stages. The total monomer addition time for the single-stage polymerization is 5 hours and no intermediate cookdown is provided. In both the 2-stage and the single-stage processes, bromoform (1.25 parts by weight per 100 parts by weight of butadiene monomer) is added as a chain transfer agent in admixture with the butadiene containing monomer stream. An aqueous stream containing (per 100 parts by weight of total monomer added) about 40 parts by weight deionized water, from about 0.5 to about 1 part by weight of sodium dodecyldiphenyl oxide disulfonate, about 0.15 part by weight sodium hydroxide and about 0.5 part by weight sodium persulfate is also added continuously over the first 5 hours of polymerization for both the 2-stage and single-stage processes.

The polymerizations are subjected to about a 3½ hour cookdown following completion of the monomer addition. Following such cookdown, the latexes are steam-stripped to remove residual monomers and volatile organic substances. The resulting aqueous latexes are then compounded with Number 1 clay pigment in a ratio of about 20 parts by weight latex solids per 100 parts by weight clay to form an aqueous paper coating composition having about 60 weight percent total solids. Coatings, at approximately 7 pounds per 3,300 sq. ft. ream (i.e., 0.01 Kg/sq. meter) of each of the resulting compositions are then applied to a general-purpose medium weight base stock by a laboratory blade coater. The coatings are dried (at either 25° C. or 100° C.) and supercalendered. The TAPPI 75° gloss and the K&N ink receptivity are determined for the various coatings prepared under different drying conditions (i.e., 25° C. and 100° C.).

The monomeric composition of the latex solids and the physical properties for the resulting coatings are summarized in Tables IV, V, VI and VII for the 2-stage (heterogeneous) polymers of Examples 5–17 and for the corresponding comparative single-stage (homogeneous) polymers (Examples C-0 through C-3).

TABLE IV

| | COMPOSITION, STAGE RATIO AND PARTICLE SIZE OF LATEXES OF EXAMPLES 1–13 AND OF COMPARATIVE SINGLE-STAGE POLYMERS | | | | |
|---|---|---|---|---|---|
| | Overall Composition | | | | |
| Example Number | Styrene (wt. %) | Butadiene (wt. %) | Acrylic Acid (wt. %) | Monomer Charge Ratio[1] 1st Stage to 2nd Stage (Wt. of Hard:Wt. of Soft) | Particle Size (micrometers) |
| C-0* | 59 | 40 | 1 | Homogeneous | 0.18 |
| 5 | 63 | 36 | 1 | 10:90 | 0.18 |
| C-1* | 63 | 36 | 1 | Homogeneous | 0.18 |
| 6 | 67 | 32 | 1 | 20:80 | 0.18 |
| C-2* | 67 | 32 | 1 | Homogeneous | 0.18 |
| 7 | 71 | 28 | 1 | 30:70 | 0.18 |
| C-3* | 71 | 28 | 1 | Homogeneous | 0.18 |
| 8 | 63 | 36 | 1 | 10:90 | 0.15 |
| 9 | 65 | 34 | 1 | 15:85 | 0.15 |
| 10 | 67 | 32 | 1 | 20:80 | 0.15 |
| 11 | 69 | 30 | 1 | 25:75 | 0.15 |
| 12 | 71 | 28 | 1 | 30:70 | 0.15 |
| 13 | 73 | 26 | 1 | 35:65 | 0.15 |
| 14 | 75 | 24 | 1 | 40:60 | 0.15 |
| 15 | 63 | 36 | 1 | 10:90 | 0.12 |
| 16 | 67 | 32 | 1 | 20:80 | 0.12 |
| 17 | 71 | 28 | 1 | 30:70 | 0.12 |

*Not an example of the invention.
[1]In the heterogeneous latexes of Examples 5–17: The first-stage monomer charge is 99 weight percent styrene and 1 weight percent acrylic acids. The second-stage monomer charge is 59 weight percent styrene, 40 weight percent 1,3-butadiene and 1 weight percent acrylic acid.

Table IV summarizes the overall monomeric composition, the intraparticle monomer distribution, and the average particle diameter for the latexes of Examples 5–17 and for the latexes of comparative Examples C-0 through C-3.

As is apparent from Table IV, the latexes of C-0 through C-3 are not examples of the invention as they comprise dispersed homogeneous interpolymer particles. The latex of C-0 corresponds in monomeric composition to the monomer charge of (and, accordingly, the soft interpolymer formed in) the second-stage polymerizations of Examples 5–17. The latexes of C-1, C-2 and C-3 correspond in overall monomeric composition and in average particle size to the latexes of Examples 5, 6 and 7, respectively. However, the latexes of C-1 through C-3 are the product of single-stage emulsion polymerizations of the entire amount of the indicated monomer charge. In contrast, the latexes of the Examples 5 through 7 are the emulsion polymerization products of a 2-stage polymerization wherein the ingredients of the indicated overall monomer charge are selectively fed in two polymerization stages. Specifically, in Examples 5, 6 and 7, (a) the first-stage monomer charge consists of, respectively, 10, 20 and 30 parts by weight of a monomer charge containing 99 weight percent styrene and 1 weight percent acrylic acid and (b) the second-stage monomer charge consists of, respectively, 90, 80 and 70 parts by weight of a monomer charge containing 59 weight percent styrene, 40 weight percent 1,3-butadiene and 1 weight percent acrylic acid.

The latexes of Examples 5-7 and of C-0 through C-3 have average particle diameters of 0.18 micrometers.

The latexes of Examples 8-14 have average particle diameters of 0.15 micrometer and the indicated proportions of the indicated first and second stage monomer charges. The latexes of Examples 15-17 have average particle diameters of 0.12 micrometer and the indicated proportions of the indicated first and second-stage monomer charges.

the minimum film-forming temperature for the latex of C-1 (i.e., 13° C.) with that of the latexes of Examples 5, 8, and 15 (i.e., 3° C.). Similarly, compare C-2 (i.e., 24° C.) with Examples 6, 10 and 16 (i.e., 7° C.) and compare C-3 (i.e., 35° C.) with Examples 7, 12 and 17 (i.e., 21° C.).

TABLE VI

TAPPI 75° GLOSS

Gloss Following Drying and Calendering As Indicated*

| Example Number | Drying Temp. = 25° C | | Drying Temp. = 100° C | |
|---|---|---|---|---|
| | 1 Supercalender Nip[1] | 4 Supercalender Nips[2] | 1 Supercalender Nip[1] | 1 Supercalender Nips[2] |
| C-0 | 55 | 69 | 55 | 69 |
| 5 | 55 | 69 | 55 | 69 |
| C-1 | 55 | 69 | 55 | 69 |
| 6 | 58 | 73 | 58 | 73 |
| C-2 | 58 | 73 | 55 | 69 |
| 7 | 62 | 74 | 62 | 74 |
| C-3 | No Film Formation | No Film Formation | 55 | 69 |
| 8 | 52 | 68 | 52 | 68 |
| 9 | 52 | 69 | 52 | 69 |
| 10 | 60 | 73 | 60 | 73 |
| 11 | 60 | 73 | 60 | 73 |
| 12 | 59 | 73 | 59 | 73 |
| 13 | No Film Formation | No Film Formation | 60 | 73 |
| 14 | No Film Formation | No Film Formation | 65 | 76 |
| 15 | 52 | 68 | 52 | 68 |
| 16 | 58 | 73 | 58 | 73 |
| 17 | 60 | 73 | 60 | 73 |

*The substrate employed is a general medium weight base stock.
[1] One pass through supercalender at 1200 pounds per linear inch (i.e., 214.5 Kg/cm) and 150° F (i.e., 65.5° C).
[2] Four passes through supercalender at 1200 pounds per linear inch (i.e., 214.5 Kg/cm) and 150° F (i.e., 65.6° C).

TABLE V

MINIMUM FILM FORMING TEMPERATURES

| Example No. | Minimum Film Forming Temp. (° C) |
|---|---|
| C-0 | 3 |
| 5 | 3 |
| C-1 | 13 |
| 6 | 7 |
| C-2 | 24 |
| 7 | 21 |
| C-3 | 35 |
| 8 | 3 |
| 9 | 3 |
| 10 | 7 |
| 11 | 12 |
| 12 | 21 |
| 13 | 37 |
| 14 | Not Measured |
| 15 | 3 |
| 16 | 7 |
| 17 | 21 |

Table V summarizes the minimum film-forming temperatures for the latexes of Examples 5-17 and for the latexes of comparative Examples C-0 through C-3. As is apparent, increasing the styrene content of the latexes (by increasing the proportion of the first-stage hard resinous polymer in the latexes of the invention or by increasing the proportion of styrene in the single monomer charge of the comparative latexes) increases the minimum film-forming temperature. It is also apparent that the 2-stage latexes of the invention have substantially lower minimum film-forming temperatures than the single-stage latexes of corresponding overall monomeric composition. Compare in Table V, for example, Table VI summarizes the TAPPI 75° gloss of paper coated with mineral pigmented coating compositions employing the latexes of Examples 5-17 and comparative Examples C-0 through C-3. The data for C-2 shows that the gloss of the coating employing that single-stage latex decreases with increased drying temperature. In contrast, the gloss of the coatings of Examples 5-17 is not affected by increasing the drying temperature from 25° C. to 100° C. so long as the drying temperature employed equals or exceeds the minimum film-forming temperature of the latex of the Example.

The data in Table VI also demonstrates the gloss improvement for paper coatings employing the 2-stage latexes of the invention relative to single-stage latexes corresponding in monomeric composition to the second-stage monomer charge (i.e. in comparison to the gloss of C-0). For the particular hard and soft polymers employed in Examples 5-17, such gloss improvement is seen to commence at a stage ratio of between 10 and 20 parts by weight per 100 parts by weight of total monomer in the first and second stages combined.

In addition, the 100° C. drying temperature data demonstrates the gloss improvement of the compositions of the invention in comparison to those employing the corresponding single-stage latex. (Compare the 100° C. drying temperature data of C-2 and C-3 with the corresponding data for Examples 2 and 3, respectively.)

TABLE VII

K&N INK RECEPTIVITY

| Example Number | K&N Ink Receptivity Following Drying As Indicated* | |
|---|---|---|
| | Drying Temp. = 25° C | Drying Temp. = 100° C |
| C-0 | 13.8 | 13.8 |
| 5 | 15.6 | 15.6 |
| C-1 | 14.0 | 14.0 |
| 6 | 17.5 | 17.5 |
| C-2 | 17.0 | 14.0 |
| 7 | 18.2 | 18.2 |
| C-3 | No Film Formed | 14.0 |
| 8 | 14.5 | 14.5 |
| 9 | 16.2 | 16.2 |
| 10 | 16.5 | 16.5 |
| 11 | 17.5 | 17.5 |
| 12 | 17.6 | 17.6 |

TABLE VII-continued

K&N INK RECEPTIVITY

| Example Number | K&N Ink Receptivity Following Drying As Indicated* | |
|---|---|---|
| | Drying Temp. = 25° C | Drying Temp. = 100° C |
| 13 | No Film Formed | 17.7 |
| 14 | No Film Formed | 18.0 |
| 15 | 13.0 | 13.0 |
| 16 | 15.0 | 15.0 |
| 17 | 16.0 | 16.0 |

*The substrate employed is a general purpose medioum weight base stock.

Table VII summarizes the K&N ink receptivity of paper coated with mineral pigmented coating compositions employing the latexes of Examples 5–17 and latexes of comparative Examples C-0 through C-3. As is apparent from comparing Examples 5–7 with comparative Examples C-1 through C-3, respectively, the ink receptivity of coatings of the invention is better (particularly at the higher drying temperature) than that of coatings employing the single-stage latexes of corresponding monomeric composition. In addition, the coatings of the invention (see Examples 5–7) are seen to have ink receptivity which is superior to that of the coating (i.e., C-0) employing the homogeneous latex corresponding in composition to the second-stage monomer charge. Further, the coating of C-2 exhibits ink receptivity which decreases with increasing drying temperature. In contrast, the K&N ink receptivity of the coatings of Examples 5–17 are seen to be insensitive to the drying temperature employed so long as the drying temperature equals or exceeds the minimum film-forming temperature of the 2-stage latex employed.

While the invention has been described with reference to specific illustrative examples, such examples are not to be understood as limiting the scope of the instantly claimed invention.

What is claimed is:

1. An aqueous polymer latex,
(A) the dispersed polymer particles of which are heterogeneous and individually comprise per 100 parts by weight of the polymer particle:
   (1) from about 50 to about 90 parts by weight of a soft interpolymer domain having a glass transition temperature equal to or less than about 25° C. and comprising, based upon the total soft interpolymer:
      (a) from about 30 to about 69 weight percent of a monovinylidene aromatic monomer;
      (b) from about 30 to about 60 weight percent of an open-chain aliphatic conjugated diene having from 4 to about 9 carbon atoms; and
      (c) from about 1 to about 10 weight percent of a monoethylenically unsaturated carboxylic acid; and
   (2) from about 10 to about 50 parts by weight of a hard resinous polymer domain having a glass transition temperature of at least about 85° C.; and
(B) which is prepared by emulsion polymerizing the monomers of the soft interpolymer domain in an aqueous medium comprising dispersed particles of the hard resinous polymer.

2. The polymer latex of claim 1 wherein the heterogeneous polymer particles comprise from about 50 to about 85 parts by weight of the soft interpolymer domain and from about 15 to about 50 parts by weight of the hard resinous polymer domain per 100 parts by weight of heterogeneous polymer particle.

3. The polymer latex of claim 1 wherein the soft interpolymer domain comprises, based upon the total soft interpolymer:
   (1) from about 50 to about 63 weight percent of a monovinylidene aromatic monomer;
   (2) from about 35 to about 45 weight percent of an open-chain aliphatic conjugated diene; and
   (3) from about 2 to about 5 weight percent of a monoethylenically unsaturated carboxylic acid.

4. The polymer latex of claim 1 wherein:
   (1) the monovinylidene aromatic monomer is styrene; and
   (2) the open-chain aliphatic conjugated diene is 1,3-butadiene.

5. The polymer latex of claim 4 wherein the monoethylenically unsaturated carboxylic acid is acrylic acid, methacrylic acid, itaconic acid, fumaric acid, maleic acid, or a combination thereof.

6. The polymer latex of claim 1 wherein the hard resinous polymer is a copolymer comprising a predominant amount of styrene and from about 1 to about 10 weight percent of a monoethylenically unsaturated carboxylic acid based upon the total copolymer weight.

7. The polymer latex of claim 1 wherein the soft interpolymer domain further comprises from about 1 to about 20 weight percent, based upon the total soft interpolymer, of a hydroxyalkylacrylate containing from 2 to about 4 carbon atoms in the alkyl group.

8. The polymer latex of claim 1 wherein the soft interpolymer domain further comprises from about 1 to about 10 weight percent, based upon the total soft interpolymer of 2-hydroxyethyl acrylate.

9. The polymer latex of claim 1 wherein the dispersed heterogeneous polymer particles constitute from about 20 to about 65 weight percent of the total polymer latex.

10. The polymer latex of claim 1 wherein the dispersed heterogeneous polymer particles have an average diameter of from about 0.08 to about 0.3 micrometer.

11. An improved aqueous paper-coating dispersion comprising:
   (1) a pigment; and
   (2) the polymer latex of claim 1 as a binder.

12. The aqueous paper-coating dispersion of claim 11 wherein the amount of dispersed heterogeneous polymer particles is from about 5 to about 30 parts by weight per 100 parts by weight of pigment, all parts being on a dry basis.

13. An improved coated paper product comprising a paper sheet carrying a dried deposit of a coating composition comprising:
   (1) a pigment; and
   (2) a binder comprising the polymer solids of the latex of claim 1.

14. The paper product of claim 13 wherein amount of polymer solids is from about 5 parts to about 30 parts by weight per 100 parts by weight of the pigment.

* * * * *

UNITED STATES PATENT AND TRADEMARK OFFICE
CERTIFICATE OF CORRECTION

PATENT NO. : 4,134,872

DATED : January 16, 1979

INVENTOR(S) : Do I. Lee

It is certified that error appears in the above-identified patent and that said Letters Patent are hereby corrected as shown below:

Column 4, line 20, delete "corresponding" and insert --correspondingly--.

Column 5, line 44, delete "hydroxyalkylacrylates" and insert --hydroxyalkyl acrylates--.

Column 10, line 6, delete "coloring" and insert --coating--.

Column 15, heading of Table II, delete "BOAD" and insert --BOARD--.

Column 16, Table III, under the first heading, line 6, delete "4 Calender Nips 71.8" and insert --4 Calender Nips--.

Column 16, Table III, under the second heading, line 5, delete "73.7" and insert --71.8--.

Column 16, Table III, under the third heading, line 5, delete "69.9" and insert --73.7--.

UNITED STATES PATENT AND TRADEMARK OFFICE
CERTIFICATE OF CORRECTION

PATENT NO. : 4,134,872

DATED : January 16, 1979

INVENTOR(S) : Do I. Lee

It is certified that error appears in the above-identified patent and that said Letters Patent are hereby corrected as shown below:

Column 16, Table III, under the fourth heading, line 5, insert --69.9--.

Column 18, Table IV, footnote 1, delete "first-stagemonomer" and insert --first-stage monomer--.

Column 20, Table VI, the asterisk footnote, before "medium" insert --purpose--.

Column 21, Table VII-continued, the asterisk footnote, delete "medioum" and insert --medium--.

Signed and Sealed this

Third Day of July 1979

[SEAL]

Attest:

LUTRELLE F. PARKER

*Attesting Officer*  *Acting Commissioner of Patents and Trademarks*